(12) United States Patent
Boswell

(10) Patent No.: US 10,818,196 B2
(45) Date of Patent: Oct. 27, 2020

(54) MECHANICAL COMPUTER WITH REPOSITIONABLE COMPONENTS

(71) Applicant: Paul Garrett Boswell, Shoreview, MN (US)

(72) Inventor: Paul Garrett Boswell, Shoreview, MN (US)

(*) Notice: Subject to any disclaimer, the term of this patent is extended or adjusted under 35 U.S.C. 154(b) by 362 days.

(21) Appl. No.: 16/008,142

(22) Filed: Jun. 14, 2018

(65) Prior Publication Data

US 2018/0366027 A1    Dec. 20, 2018

Related U.S. Application Data

(60) Provisional application No. 62/520,181, filed on Jun. 15, 2017.

(51) Int. Cl.
| | |
|---|---|
| *G09B 19/00* | (2006.01) |
| *A63F 3/04* | (2006.01) |
| *A63F 7/02* | (2006.01) |
| *A63F 7/30* | (2006.01) |

(52) U.S. Cl.
CPC ........ *G09B 19/0053* (2013.01); *A63F 3/0457* (2013.01); *A63F 7/02* (2013.01); *A63F 7/022* (2013.01); *A63F 2003/0463* (2013.01); *A63F 2007/301* (2013.01)

(58) Field of Classification Search
CPC .... G09B 19/00; G09B 19/0053; G09B 19/02; G09B 23/0223; G09B 23/186; G09B 23/02; G09B 23/04; A63F 7/3622

USPC ........ 434/118, 188, 191, 208; 273/108, 109, 273/110, 120 R; 446/168, 173
See application file for complete search history.

(56) References Cited

U.S. PATENT DOCUMENTS

| | | | | |
|---|---|---|---|---|
| 1,826,215 A | * | 10/1931 | Hutchison ............. | A63F 7/3622 273/121 B |
| 2,058,202 A | * | 10/1936 | Anderson ............... | A63F 7/025 273/111 |
| 2,998,673 A | * | 9/1961 | Rhodes ................. | A63F 7/3622 446/168 |
| 3,006,082 A | * | 10/1961 | Libbey ................... | G09B 19/02 434/118 |
| 3,116,014 A | * | 12/1963 | Aymar .................... | G06G 3/00 235/61 A |
| 3,314,169 A | * | 4/1967 | Wold ..................... | G09B 23/04 434/189 |
| 3,331,143 A | | 7/1967 | Weisbecker | |

(Continued)

*Primary Examiner* — Kurt Fernstrom
(74) *Attorney, Agent, or Firm* — Patterson Thuente Pedersen, P.A.

(57) ABSTRACT

A mechanical computing system configured to serve as an aid in learning fundamental aspects of coding. The mechanical computing system including a substrate having a flow path between an upstream portion and a downstream portion, and a plurality of repositionable programming members pivotably coupled to the substrate and configured to guide and interact with units dispensed along the flow path from the upstream portion to the downstream portion, wherein a first programming member is configured to pivot relative to the substrate upon interaction with a unit traversing along the flow path, and wherein a second programming member positioned upstream of the first programming member is configured to pivot relative to the substrate based on feedback from the first programming member.

20 Claims, 13 Drawing Sheets

(56) References Cited

U.S. PATENT DOCUMENTS

| | | | | |
|---|---|---|---|---|
| 3,390,471 A | * | 7/1968 | Godfrey | G09B 23/186 434/118 |
| 3,403,459 A | * | 10/1968 | Divilbiss | G09B 23/186 434/118 |
| 3,747,844 A | * | 7/1973 | Youngman | G09B 19/02 235/68 |
| 3,801,094 A | * | 4/1974 | Treaster | A63F 7/3622 472/72 |
| 3,994,076 A | | 11/1976 | Bertman | |
| 4,006,344 A | * | 2/1977 | Schutte | G06C 1/00 235/68 |
| 4,108,438 A | | 8/1978 | Rackman | |
| 4,156,527 A | | 5/1979 | Rackman | |
| 4,159,593 A | * | 7/1979 | Miller | A63F 7/02 273/456 |
| 4,474,558 A | * | 10/1984 | Quercetti | G09B 19/02 434/189 |
| 4,662,846 A | | 5/1987 | Quercetti | |
| 5,149,095 A | * | 9/1992 | Kashimoto | A63F 7/022 273/108 |
| 5,213,506 A | * | 5/1993 | Lapsa | G09B 19/0053 434/118 |
| 6,056,620 A | * | 5/2000 | Tobin | A63F 7/3622 273/120 R |
| 6,811,401 B1 | * | 11/2004 | Cruickshank | G09B 19/02 235/68 |
| 9,345,979 B2 | * | 5/2016 | Matthes | A63H 18/028 18/28 |
| 9,947,241 B2 | * | 4/2018 | O'Neill | G09B 23/12 |
| 2011/0070803 A1 | * | 3/2011 | Hoffman | A63F 7/3622 446/168 |

\* cited by examiner

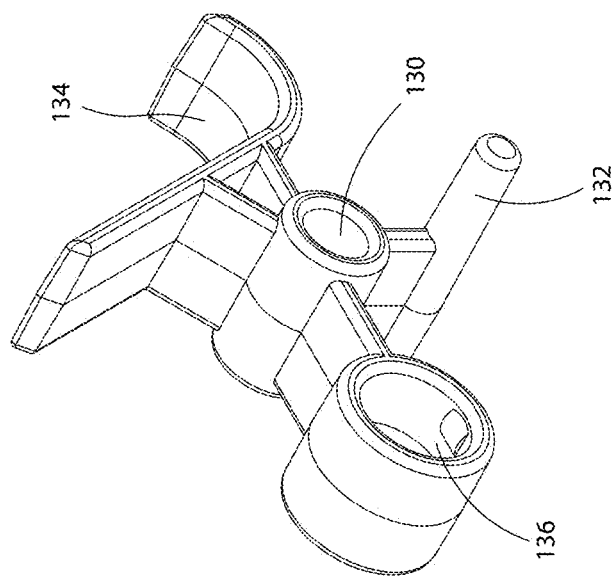
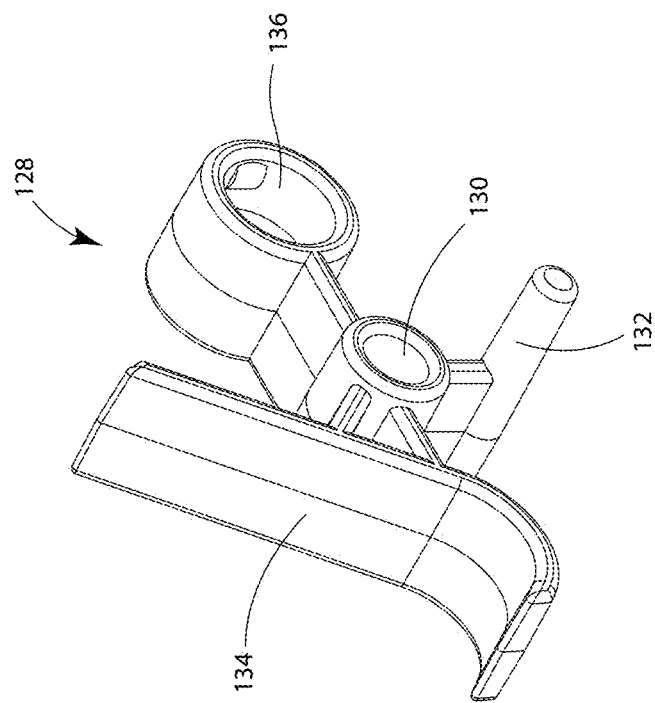

Case #1
Input A: False
Input B: False
Output: False

Case #2
Input A: True
Input B: False
Output: True

MECHANICAL COMPUTER WITH REPOSITIONABLE COMPONENTS

RELATED APPLICATION

The present application claims the benefit of U.S. Provisional Application No. 62/520,181 filed Jun. 15, 2017, which is hereby incorporated herein in its entirety by reference.

TECHNICAL FIELD

The present disclosure relates generally a mechanical computing system, and more particularly to a Turing complete mechanical computing system with repositionable members configured to carry out a variety of logic functions.

BACKGROUND

The programming of computers, frequently referred to as "coding," has become a valuable skill in a wide range of fields. This has led to greater efforts to teach coding, or at least computational thinking, at a younger age. However, learning code is especially difficult for children, in part because of the high precision required in the syntax of programming languages. For example, semicolons must always be at the end of the line and parentheses must be in just the right places. Even correct capitalization of certain letters is necessary in most programming languages. The syntax requirements put a high hurdle in front of a child eager to learn coding.

Another problem is that there are very few tools to teach how computers themselves work. Educational games, tools, and toys that teach coding treat computers like abstract, black boxes. They teach how to control computers, but not how they work. This is, in part, because there are so many layers of complication involved in the proper functioning of a computer (e.g., electrical theory, complex circuitry, advanced math, etc.). Ultimately, these layers of complication inhibit not only children, but also adults, from having a grounded understanding of the fundamental concepts behind how computers work.

Although various strategies to teach programming basics have been developed over the years, these strategies lack the ability to teach fundamental computer programming concepts, and especially how computers work, in a manner that that is relatively simple, engaging, and can be easily understood by a child. Applicant of the present disclosure has identified a need for a device and method to address this concern.

SUMMARY OF THE DISCLOSURE

Embodiments described or otherwise contemplated herein substantially provide systems and methods of use configured to serve as an aid in learning fundamental computer programming and computer function concepts. In particular, embodiments of the present disclosure provide mechanical computing systems in which a user can utilize different repositionable components or members to program a flow path along which marbles roll to solve logic puzzles. As the marbles are incrementally dispensed along the flow path, like the cycles of a processor, certain repositionable components can rotate or pivot to alter the flow path as well as store and display information. Based on the positions of different types of repositionable components, the mechanical computing system can be configured to count, solve mathematical problems, perform logical operations, or perform many other tasks routinely carried out by electronic computers. Accordingly, embodiments of the present disclosure enable users to visualize the mechanics behind computer operation and learn the basics of computer programming.

One embodiment of the present disclosure provides a game to serve as an aid in learning fundamental aspects of coding. The game can include a board and a plurality of repositionable programming members. The board can have a flow path between an upstream portion and a downstream portion. The plurality of repositionable programming members can be pivotably coupled to the board and can be configured to guide and interact with marbles dispensed along the flow path from the upstream portion to the downstream portion, wherein a first programming member is configured to pivot relative to the board upon interaction with a marble traversing along the flow path, and wherein a second programming member positioned upstream of the first programming member is configured to pivot relative to the board based on feedback from the first programming member, thereby enabling the game to be Turing complete.

In one embodiment, the first repositionable member can be a gear bit configured to display and store bits of information. In one embodiment, the gear bit can further be configured to interact with one or more adjacent repositionable members upon pivoting. In one embodiment, at least one of the plurality of repositionable members can include a ramp configured to serve as a conduit to move at least one marble along the flow path. In one embodiment, at least one of the plurality of repositionable members includes a crossover configured to redirect a lateral course of at least one marble along the flow path. In one embodiment, at least one of the plurality of repositionable members includes a bit configured to display and store bits of information. In one embodiment at least one of the plurality of repositionable members includes a gear configured to interact with one or more adjacent repositionable members upon pivoting. In one embodiment at least one of the plurality of repositionable members includes an interceptor configured to capture at least one marble, thereby ending the incremental dispensation of subsequent marbles. In one embodiment, the game can further include a first incremental unit dispenser and a second incremental unit dispenser configured to incrementally dispense a plurality of marbles along the flow path. In one embodiment positioning of the plurality of repositionable programming members on the board enables the game to carry out one or more logic functions.

Another embodiment of the present disclosure provides a mechanical computing system having a substrate, incremental unit dispenser, and plurality of repositionable members. The substrate can have an upstream portion and a downstream portion. The incremental unit dispenser can be configured to incrementally dispense a plurality of units along the flow path of the substrate from the upstream portion to the downstream portion. The plurality of repositionable members can be operably coupled to the substrate and can be configured to guide and interact with the plurality of units along the flow path, wherein a first repositionable member is configured to pivot relative to the substrate upon interaction with at least one unit of the plurality of units, and a second repositionable member positioned upstream of the first repositionable member is configured to pivot relative to the substrate based on the pivoting of the first repositionable member.

Another embodiment of the present disclosure provides a method of operating a mechanical computing system including: providing a substrate having an upstream portion and a downstream portion; positioning at least a first repositionable member and a second repositionable member on the substrate, wherein the second repositionable member is positioned upstream of the first repositionable member; and incrementally dispensing a plurality of units along a flow path of the substrate from the upstream portion to the downstream portion, wherein the first repositionable member is configured to pivot relative to the substrate upon interaction with at least one unit of the plurality of units, and the second repositionable member is configured to pivot relative to the substrate based on pivoting of the first repositionable member.

The summary above is not intended to describe each illustrated embodiment or every implementation of the present disclosure. The figures and the detailed description that follow more particularly exemplify these embodiments.

BRIEF DESCRIPTION OF THE DRAWINGS

The disclosure can be more completely understood in consideration of the following detailed description of various embodiments of the disclosure, in connection with the accompanying drawings, in which:

FIG. 3A is a first perspective view depicting a ramp repositionable member, in accordance with an embodiment of the disclosure.

FIG. 3B is a second perspective view depicting the ramp repositionable member of FIG. 3A.

Figure 1:
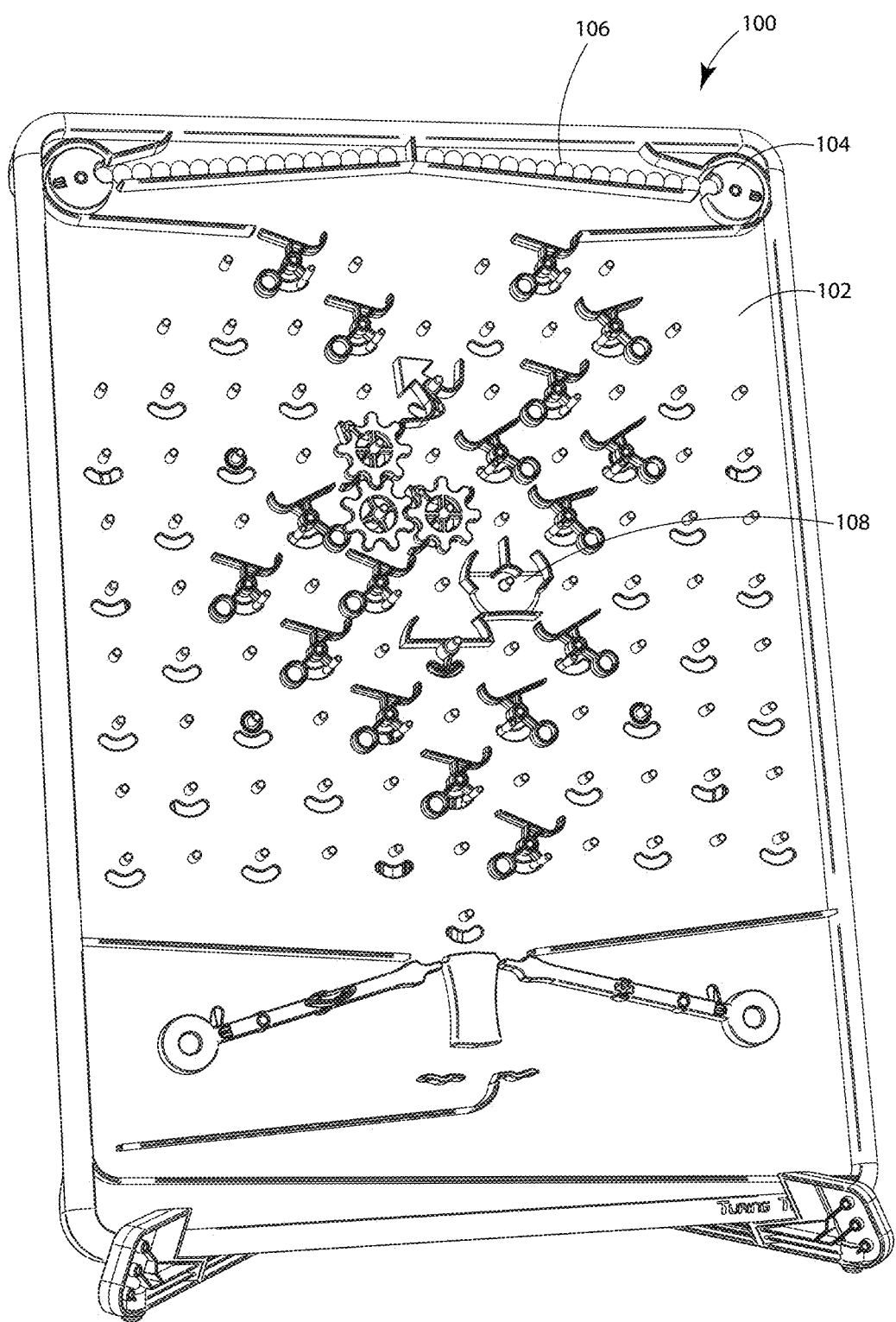
FIG. 1 is a perspective view depicting a mechanical computing system, in accordance with an embodiment of the disclosure.

While embodiments of the disclosure are amenable to various modifications and alternative forms, specifics thereof shown by way of example in the drawings will be described in detail. It should be understood, however, that the intention is not to limit the disclosure to the particular embodiments described. On the contrary, the intention is to cover all modifications, equivalents, and alternatives falling within the spirit and scope of the subject matter as defined by the claims.

DETAILED DESCRIPTION

Referring to FIG. 1, a perspective view of a mechanical computing system 100 is depicted in accordance with an embodiment of the disclosure. In one embodiment, the mechanical computing system 100 can include a substrate 102, an incremental dispenser 104 configured to dispense one or more units 106, and one or more repositionable members 108. In one embodiment, the one or more repositionable members 108 can be selectively positioned on the substrate 102 to create or "program" a flow path along which a one or more units 106 can traverse. The one or more units 106 can be incrementally dispensed by the incremental dispenser 104, such that only a single unit 106 traverses along the programmed flow path at any given time. As the units 106 are dispensed and traverse along the flow path, the units 106 can cause the one or more positionable members 108 to shift or rotate relative to the substrate 102, thereby altering the flow path along which a subsequent units 106 traverse, thereby effectively carrying out a desired logical function or objective.

Figure 2B:
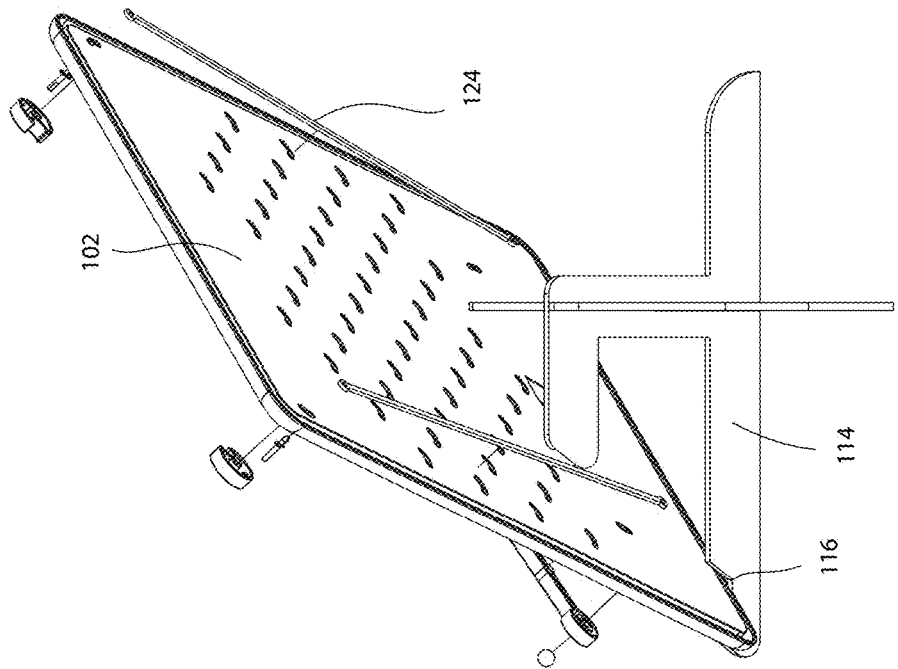
FIG. 2B is a partially exploded, rear perspective view depicting the substrate, incremental unit dispenser, and stand of FIG. 2A.
Figure 2A:
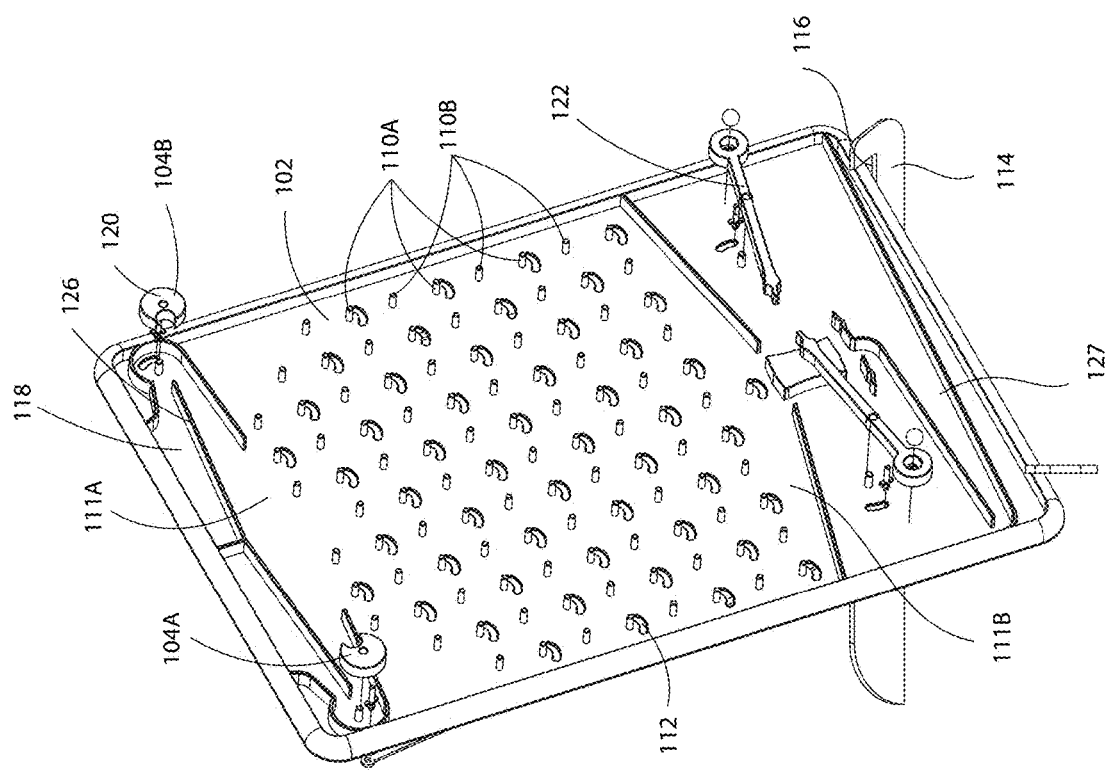
FIG. 2A is a partially exploded, front perspective view depicting a substrate, incremental unit dispenser, and stand, in accordance with an embodiment of the disclosure.

Referring to FIGS. 2A-B, perspective front and rear views of a substrate 102 are depicted in accordance with an embodiment of the disclosure. In one embodiment, the substrate 102 can be formed as a substantially rigid, flat-panel, such as a game board. The substrate 102 can include a plurality of pegs 110A/110B and channels 112 configured to enable operable coupling of the repositionable members 108 to the substrate 102. In one embodiment, the plurality of pegs 110A/110B can extend laterally from the surface of the substrate 102 and can be configured in a matrix having a plurality rows and columns. The channels 112 can be positioned beneath one set of pegs 110A within the matrix. In one embodiment, the two sets of pegs 110A/110B can be alternately dispersed across the substrate 102.

As depicted, in one embodiment, the substrate 102 can be substantially rectangular in shape, having an upstream portion 111A and a downstream portion 111B. Other shapes and sizes are also contemplated. The substrate 102 can be positioned on a stand 114 configured to hold the substrate 102 at an elevated angle. In some embodiments, the stand 114 can be configured to enable the tilt of the substrate 102 be adjusted to speed up or slow down the units 106 as they traverse through the programmable flow path. For example, in one embodiment, the stand 114 can include a plurality of notches 116 in which a portion of the substrate 102 can reside, thereby enabling tilt adjustment. In other embodiments, multiple substrates 102 can be operably coupled together to extend the overall size of the programmable flow path.

The incremental unit dispenser 104 can include a reservoir 118, dispenser 120, incrementor 122, and link 124 operably coupling the dispenser 120 to the incrementor 122. The reservoir 118 can be configured to house a plurality of units 106. In one embodiment, the units 106 can be spheres, such as marbles, ball bearings, or the like. In one embodiment, the reservoir 118 can be defined by a portion of the substrate 102. For example, the substrate 102 can include one or more walls 126 defining the constraints of the reservoir 118. The downstream portion 111B of the substrate can include a collector 127 configured to collect the units 106 after traversing through the programmable flow path.

The dispenser 120 can be configured to selectively enable one unit 106 housed within the reservoir 118 to be incrementally dispensed from the reservoir 118 under the force of gravity at a time, similar to cycles of a processor. The dispenser 120 can be operated via incrementor 122, which can be operably coupled to the dispenser 120. For example, in one embodiment, the weight of a unit 106 pushing against incrementor 122 under the force of gravity can cause the incrementor 122 to pivot or rotate about an axis, which can in turn affect a rotation of dispenser 120 about its axis via link 124, thereby dispensing a subsequent unit 106. In this manner, the incremental unit dispenser 104 can be configured to incrementally dispense units 106, such that only a single unit 106 traverses along the programmable path at any given time.

In one embodiment, the mechanical computing system 100 can include a pair of incremental unit dispensers 104A-B, although more or less incremental unit dispensers are contemplated. In some embodiments, the programmable path can cause a unit 106 dispensed from a first (left side) incremental unit dispenser 104A to crossover to a second (right side) incremental unit dispenser 104B. As such, a unit 106 dispensed from the first incremental unit dispenser 104A can affect the release of a subsequent unit 106 from the second incremental unit dispenser 104B, and vice versa.

Referring to FIGS. 3A-B, perspective views of a repositionable member 108 in the form of a "ramp" 128 are depicted in accordance with an embodiment of the disclosure. In one embodiment, the ramp 128 is configured to move a unit 106 laterally in a desired direction along the programmable flow path, for example, either to the left or to the right, depending on how the ramp 128 is positioned on the substrate 102.

In one embodiment, the ramp 128 can generally include a body defining a pivotable aperture 130, guide pin 132, slide 134, and counterweight 136. The ramp 128 can be operably coupled to the substrate 102 by positioning the ramp 128 such that a peg 110A of the substrate 102 traverses through the pivotable aperture 130, and the guide pin 132 is positioned within channel 112. Accordingly, the ramp 128 can be configured to pivot relative to the substrate 102 between a first position and a second position, defined by the constraints of the guide pin 132 within the channel 112, thereby enabling the slide 134 to guide a unit 106 along the programmable path. After guiding the unit 106 from the first position to the second position, the counterweight 136 can be configured to return the ramp 128 to the first position. In some embodiments, the counterweight 136 functions to slow the rate of descent of the unit along the programmable path, thereby inhibiting the units 106 from bouncing and/or otherwise departing the desired path.

Figure 4B:
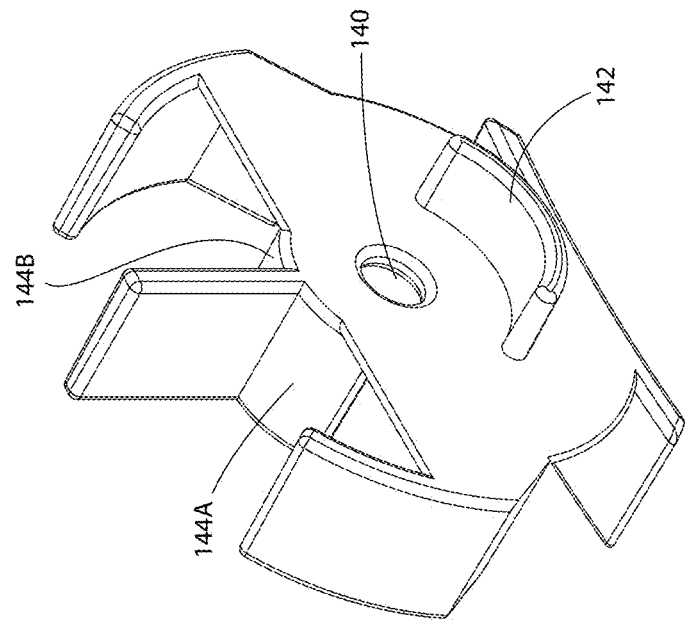
FIG. 4B is a rear perspective view depicting the crossover repositionable member of FIG. 4A.
Figure 4A:
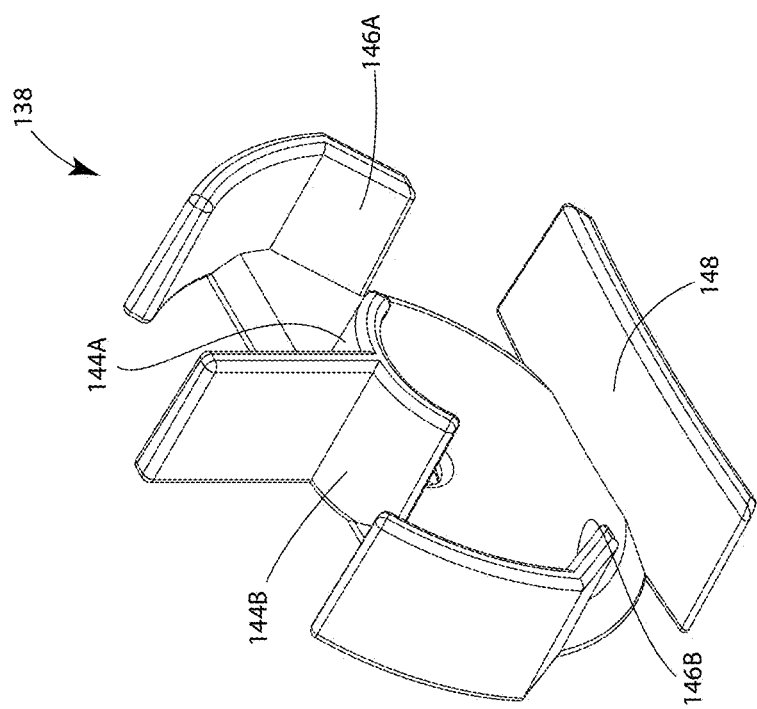
FIG. 4A is a front perspective view depicting a crossover repositionable member, in accordance with an embodiment of the disclosure.

Referring to FIGS. 4A-B, perspective front and rear views of a repositionable member 108 in the form of a "crossover" 138 are depicted in accordance with an embodiment of the disclosure. In one embodiment, the crossover 138 is configured to enable one desired path of a unit 106 to cross over another path, for example, by keeping a unit 106 traveling in the same general lateral direction (e.g., if the unit 206 enters from the left, the unit 206 will exit on the right, and vice versa).

In one embodiment, the crossover 138 can generally include a body defining an aperture 140, rotational restraint 142, partition 144A/B, ramps 146A/B, and shelf 148. The crossover 138 can be operably coupled to the substrate 102 by positioning the crossover 138 such that a peg 110A of the substrate 102 traverses through the aperture 140, and the rotational restraint 142 is positioned within channel 112. Accordingly, unlike a ramp 128, a crossover 138 is not configured to pivot relative to the substrate 102 once position. Accordingly, a unit 106 traversing down the programmable flow path will enter the crossover 138 in proximity to the partition 144A/B. Depending on the side of entry, the partition 144A/B will direct the unit towards the ramp 146A/B, which will in turn cause the unit 106 to roll onto the shelf 148, thereby maintaining the lateral direction of the unit 106 as it traverses along the programmable flow path.

Figure 5B:
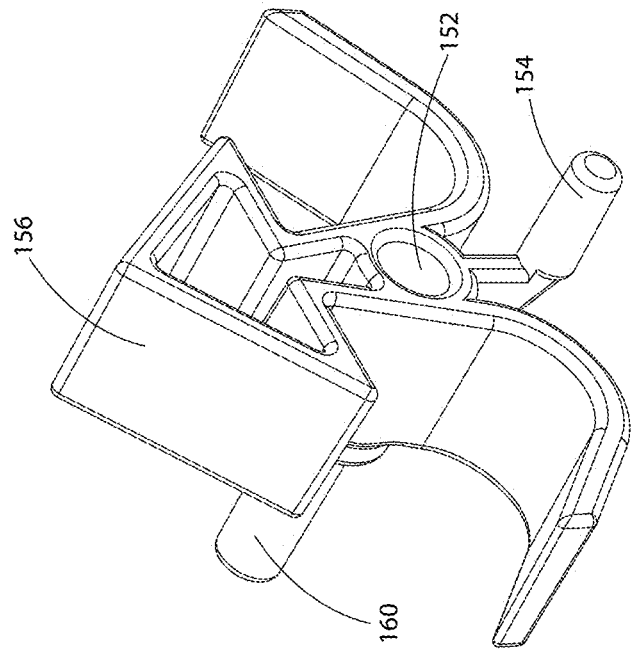
FIG. 5B is a rear perspective view depicting the bit repositionable member of FIG. 5A.
Figure 5A:
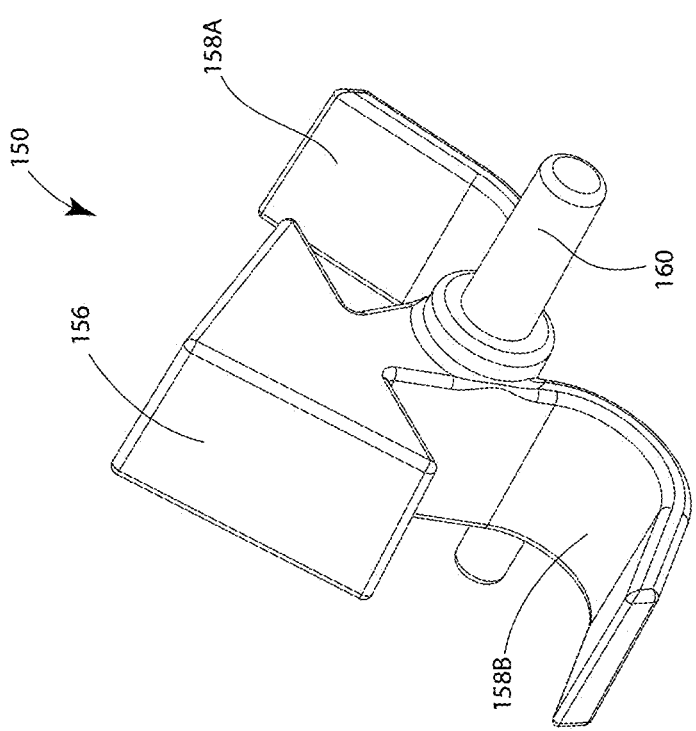
FIG. 5A is a front perspective view depicting a bit repositionable member, in accordance with an embodiment of the disclosure.

Referring to FIGS. 5A-B, perspective front and rear views of a repositionable member 108 in the form of a "bit" 150 are depicted in accordance with an embodiment of the disclosure. In one embodiment, the bit 150, which is configured to rotate approximately 45° to the left or 45° to the right depending on how the unit 106 strikes the bit 150, is configured to store information.

In one embodiment, the bit 150 can generally include a body defining a pivotable aperture 152, guide pin 154, arrow deflector 156, and slides 158A/B. In one embodiment, the bit 150 can further include a handle 160 to aid in the positioning of bit 150. The bit 150 can be operably coupled to the substrate 102 by positioning the bit 150 such that a peg 110A of the substrate 102 traverses through the pivotable aperture 152, and the guide pin 154 is positioned within channel 112. Accordingly, the bit 150 can be configured to pivot relative to the substrate 102 between a first position (e.g., in which the arrow deflector 156 generally points to the left) and a second position (e.g., in which the arrow deflector 156 generally points to the right).

A unit 106 traversing down the programmable path encountering a bit 150 positioned in the first position will strike the arrow deflector 156, roll onto the corresponding slide 158A/B, thereby causing the bit 150 to pivot from the first position to the second position, or vice versa, as the unit 106 rolls off the slide 158B. Thereafter, the bit 150 will remain in this position. Accordingly, the arrow deflector 156 serves three purposes. First, it provides a surface for units 106 to roll on upon entry. Second, it adds weight to the top part of the bit 150, which aids in maintaining the bit 150 in the desired position, effectively storing information. Third, it visually serves as a pointer to display information stored by the bit 150.

In one embodiment, the information stored by bit 150 can be thought of as binary (e.g., "0" in the first position and "1" in the second position, or vice versa). In another embodiment, a plurality of bits 150 can be used in concert to represent binary numbers; for example, a first bit can act as the 1's place, a second bit can act as the 2's, a third bit can act as the 4's place, and so on. Information and numbers can be input into the mechanical computing system 100 by rotating the respective handles 160 of the bits 150. Information and numbers can be output by the mechanical computing system by reading the respective positions of the bits 150.

Figure 6B:
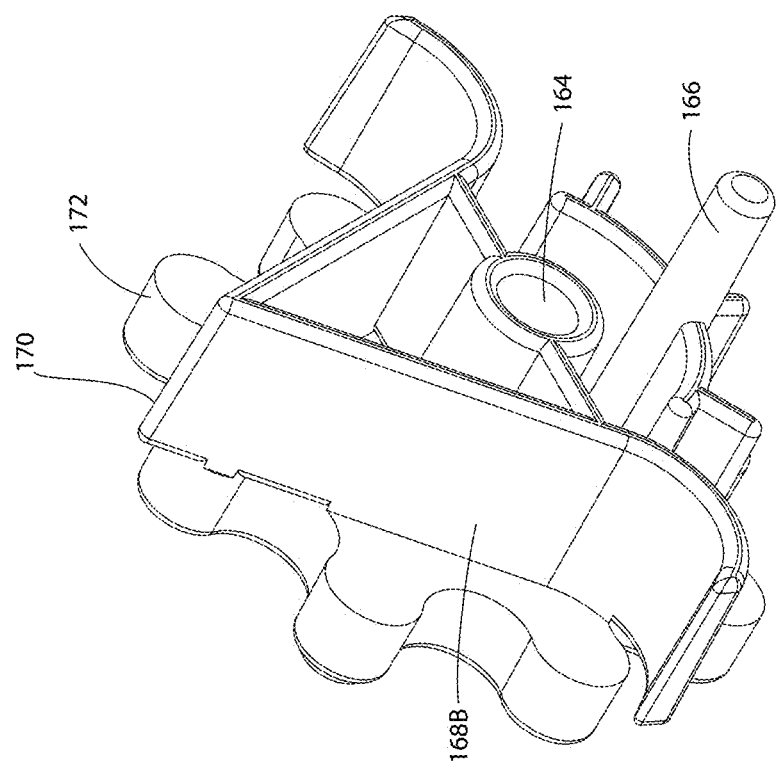
FIG. 6B is a rear perspective view depicting the gear bit repositionable member of FIG. 6A.
Figure 6A:
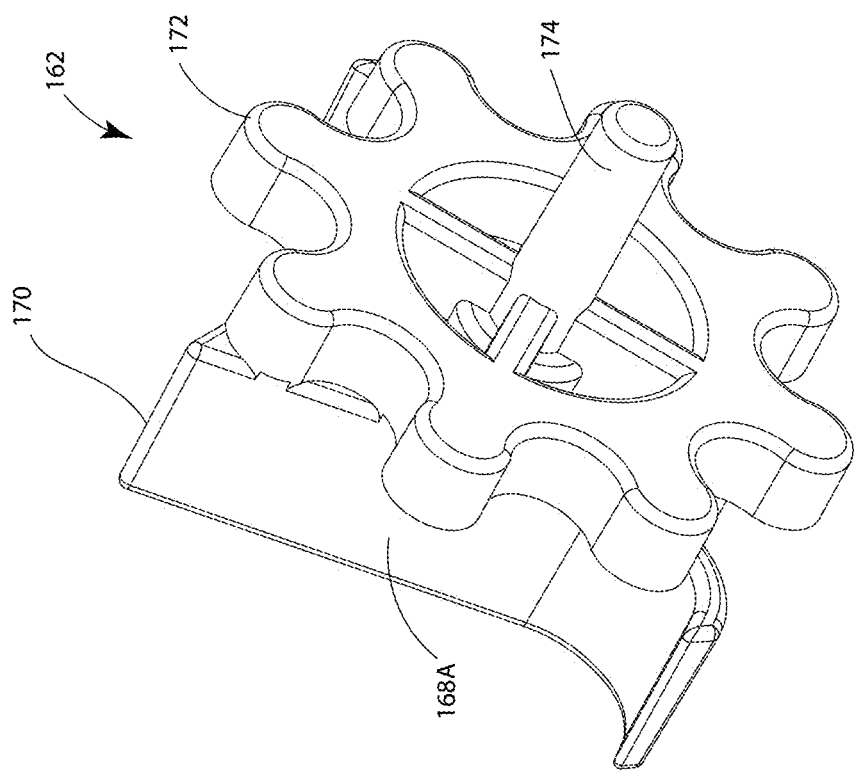
FIG. 6A is a front perspective view depicting a gear bit repositionable member, in accordance with an embodiment of the disclosure.

Referring to FIGS. 6A-B, perspective front and rear views of a repositionable member 108 in the form of a "gear bit" 162 are depicted in accordance with an embodiment of the disclosure. In one embodiment, the gear bit 162, which, in one embodiment, can be configured to rotate approximately 45° to the left or 45° to the right depending on how the unit 106 strikes the gear bit 162, is generally configured to store information and transmit information to adjacent repositionable members 108, including transmitting information upstream along the programmable flow path thereby making the mechanical computing system Turing complete.

In one embodiment, the gear bit 162 can generally include a body defining a pivotable aperture 164, guide pin 166, slides 168A/B, apex 170, gear 172, and handle 174. The gear bit 162 can be operably coupled to the substrate by positioning the gear bit 162 such that a peg 110A of the substrate 102 traverses through the pivotable aperture 164, and a guide pin 166 is positioned within the channel 112. Accordingly, the gear bit 162 can be configured to pivot relative to the substrate 102 between a first position (e.g., in which the apex 170 generally points to the left) and a second position (e.g., in which the apex 170 generally points to the right).

A unit 106 traversing down the programmable path encountering a gear bit 162 positioned in the first position roll along a slide 168A/B, thereby causing the gear bit 162 to pivot from the first position to the second position, or vice versa, as the unit 106 rolls off the slide 168A/B. The gear 172 is configured to interact with adjacent repositionable members 108, thereby imparting a rotation to effectively transmit information. Accordingly, a single gear bit 162 is capable of rotating one or more other repositionable members 108, including repositionable members 108 positioned above, below, and/or to the side of the gear bit 162 rotated by a unit 106. Information and numbers stored by the gear bit 162 can be similar to that described in connection with by bit 150. Information and numbers can be input into the mechanical computing system 100 by rotating the respective handles 174 of the gear bits 162. Information and numbers can be output by the mechanical computing system 100 by reading the positions gear bits 162.

Figure 7B:
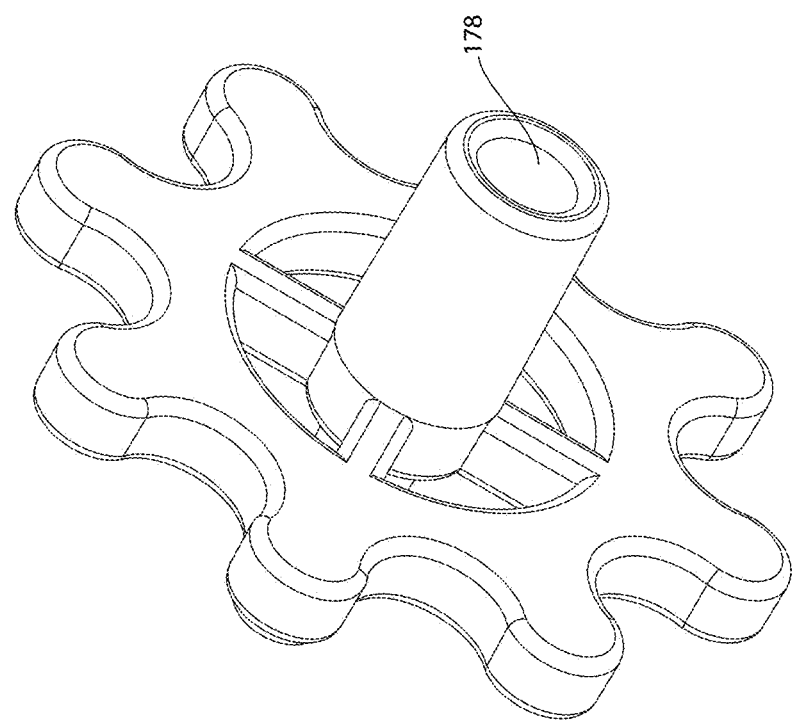
FIG. 7B is a rear perspective view depicting the gear repositionable member of FIG. 7A.
Figure 7A:
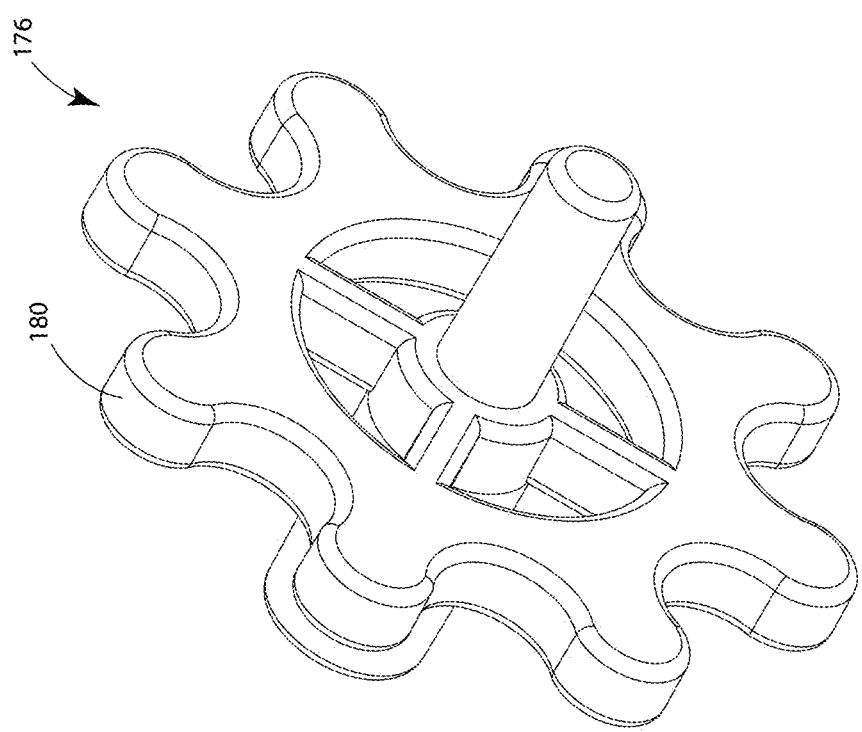
FIG. 7A is a front perspective view depicting a gear repositionable member, in accordance with an embodiment of the disclosure.

Referring to FIGS. 7A-B, perspective front and rear views of a repositionable member 108 in the form of a "gear" 176 are depicted in accordance with an embodiment of the disclosure. In one embodiment, the gear 176 (which is free to rotate 360°) is configured to transmit information to adjacent repositionable members 108.

In one embodiment, the gear 176 can generally include a body defining a pivotable aperture 178 and a gear 180. The gear 176 can be operably coupled to the substrate 102 by positioning the gear 176 such that a peg 110A/B of the substrate 102 traverses through the pivotable aperture 178. In some embodiments, gear 176 is coupleable to pegs 110B; in other embodiments gear 176 is coupleable to both pegs 110A and 110B. Accordingly, unlike other repositionable members 108, the gear 176 is not restricted by a guide pin, and therefore is unrestricted in rotation relative to the substrate 102. The gear 180 is configured to interact with adjacent repositionable members 108, thereby imparting a rotation to effectively transmit information. Accordingly, a single gear 176 is capable of rotating one or more other repositionable members 108 positioned above, below, and/ or to the side of the gear 176.

Figure 8B:
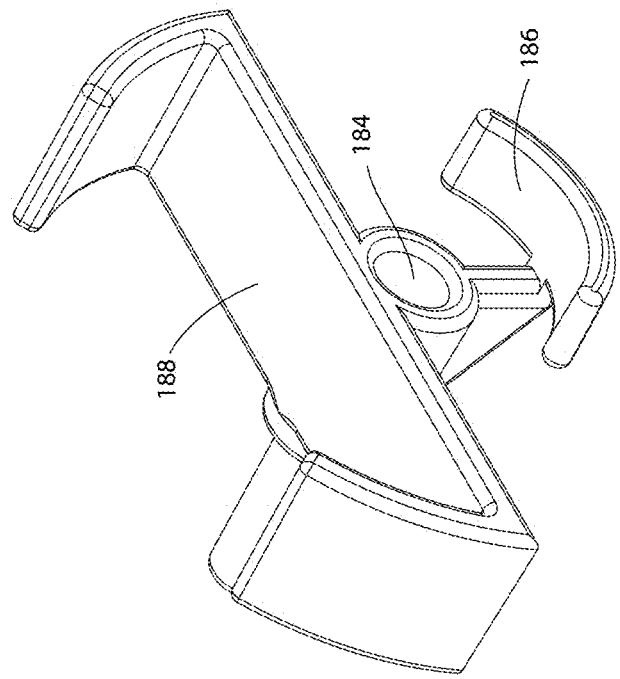
FIG. 8B is a rear perspective view depicting the interceptor repositionable member of FIG. 8A.
Figure 8A:
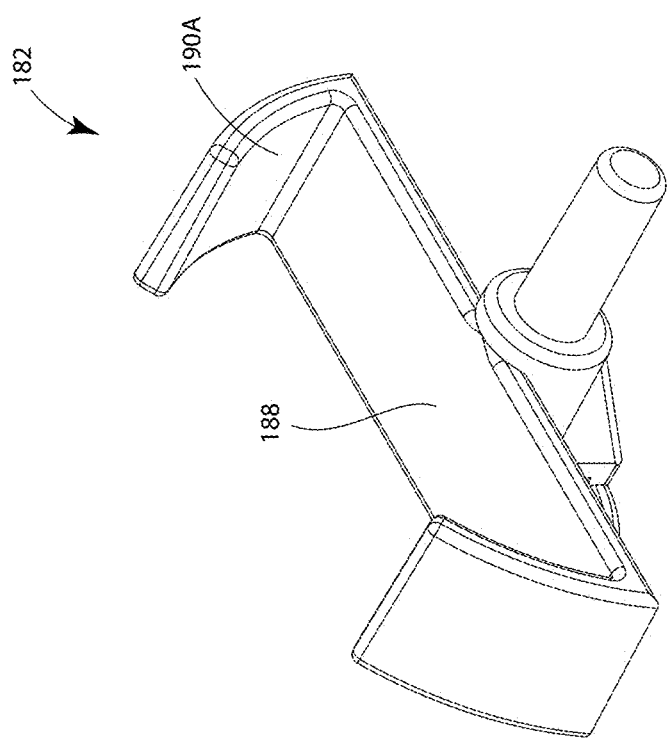
FIG. 8A is a front perspective view depicting an interceptor repositionable member, in accordance with an embodiment of the disclosure.

Referring to FIGS. 8A-B, perspective front and rear views of a repositionable member 108 in the form of an "interceptor" 182 are depicted in accordance with an embodiment of the disclosure. In one embodiment, the interceptor 182 is configured to intercept and/or capture one or more units 106 traversing along the programmable path; thereby, in some cases, ending the incremental dispensation of subsequent units 106.

In one embodiment, the interceptor 182 can generally include a body defining an aperture 184, rotational restraint 186, and shelf 188. The interceptor 182 can be operably coupled to the substrate 102 by positioning the interceptor 182 such that a peg 110A of the substrate 102 traverses through the aperture 184, and the rotational restraint 186 is positioned within channel 112. Accordingly, like the crossover 138, the interceptor 182 is not configured to pivot relative to the substrate 102 once position. Accordingly, a unit 106 traversing down the programmable path encountering interceptor 182 will be effectively captured by the shelf 188, thereby effectively ending the program by terminating the incremental dispensation of additional units 106. In some embodiments, the shelf 188 may include one or more lips 190A/B to aid in the retention of unit 106 on the shelf 188. Other retention aiding configurations of shelf 188, such as a curve or contour, are also contemplated.

In operation, mechanical computing system 100 can be programmed to complete various logical operations and/or objectives. In some cases, the desired output may be in the form of a specific quantity or order units flowing through the programmable path. For example, where black units 106 are dispensed from a first incremental unit dispenser 104A, and white units 106 are dispensed from a second incremental unit dispenser 104B, the objective may be to establish an output wherein units 106 having flowed through the programmable path alternate between black and white. In another example, the objective may be to terminate the program after a certain quantity of either black or white units 106 have completed their flow through the programmable path and/or reside in the collector 127.

In some embodiments, the output of the mechanical computing system 100 can be the positions of the repositionable members 108; particularly, the positions of the bits 150 and gear bits 162, which can represent binary information (e.g., "0" if pointing to the right or "1" if pointing to the left, or vice versa). In other embodiments, a plurality of bits 150 and/or gear bits 162 can be used in concert to represent binary numbers. For example, a first bit can represent a "0" if pointing to the left and "1" if pointing to the right, a second bit can represent a "0" if pointing to the left and "2" if pointing to the right, a third bit can represent a "0" if pointing to the left and "4" if pointing to the right, a fourth bit can represent a "0" if pointing to the left and "8" if pointing to the right, and so on. Accordingly, the flow path could be programmed to count by integers upon each incremental unit 106 traversing through the flow path.

Figure 9A:
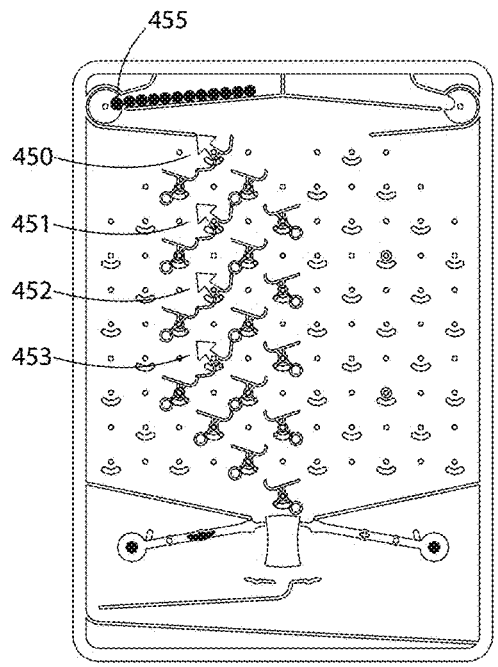
FIGS. 9A-D depict a mechanical computing system configured as a 4-bit counter, as well as its execution, in accordance with an embodiment of the disclosure.

Referring to FIGS. 9A-D, an example 4-bit counter and its execution are depicted in accordance with an embodiment of the disclosure. The 4-bit counter counts and displays the number of units that traverse through the programmed flow path in binary during execution (in this case 12 units). As depicted in FIG. 9A, the 4-bit counter includes four bits 450, 451, 452, and 453, which together display a 4-bit binary number. In particular, bit 450 represents "0" if pointing to the left and "1" if pointing to the right. Bit 451 represents "0" if pointing to the left and "2" if pointing to the right. Bit 452 represents "0" if pointing to the left and "4" if pointing to the right. Bit 453 represents "0" if pointing to the left and "8" if pointing to the right.

Figure 9B:
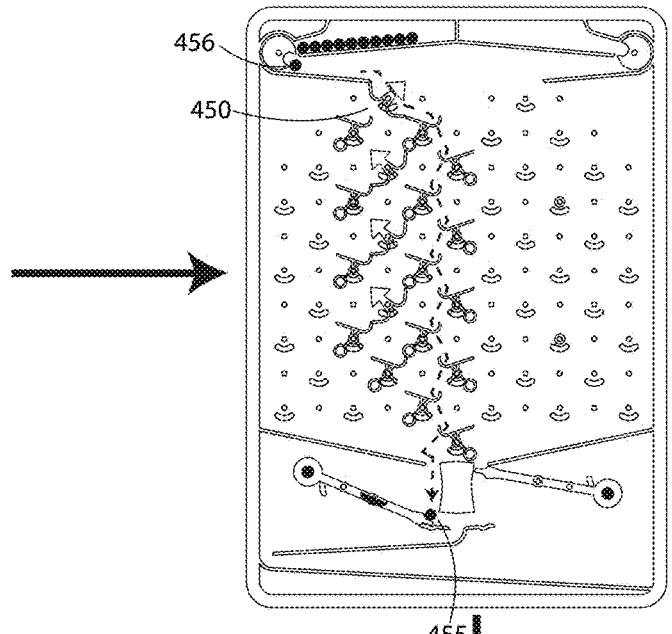

As depicted in FIG. 9B, a user can initiate the program by depressing the incrementor 122, thereby releasing a first unit 455. As the unit 455 travels over bit 450, the unit 455 flips the bit 450 from the left to the right. The unit then rolls down the substrate, carried along by a series of ramps 128 that direct the unit 455 towards the incrementor 122. The weight of the unit 455 on the incrementor 122 causes the release of the second unit 456. The first unit 455 is then captured in the collector 127. Accordingly, following the complete traversal of the first unit 455 through the programmed flow path, the 4-bit counter indicates a value of "1."

Figure 9C:
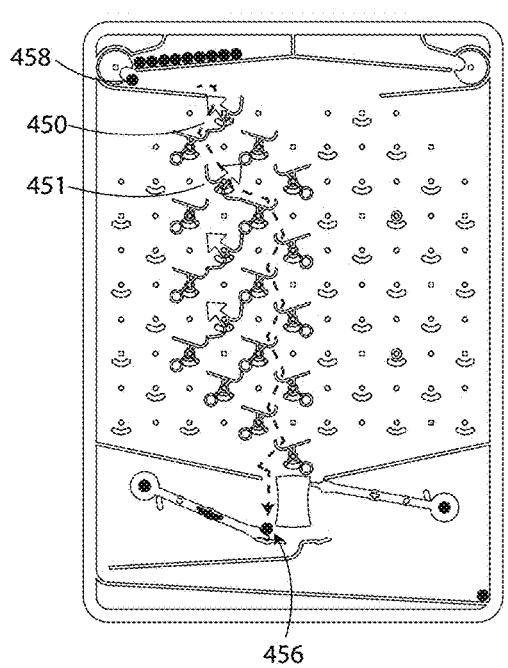

As depicted in FIG. 9C, the second unit 456 flips the bit 450 back to the left, then flips bit 451 from the left to the right. The second unit 456 then rolls down the substrate, carried along by a series of ramps 128 that direct the unit 456 towards the incrementor 122. Again, the weight of the unit 456 on the incrementor 122 causes the release of the third unit 458. The second unit 456 is then captured in the collector 127. Accordingly, following the complete traversal of the second unit 456 through the programmed flow path, the 4-bit counter indicates a value of "2."

Figure 9D:
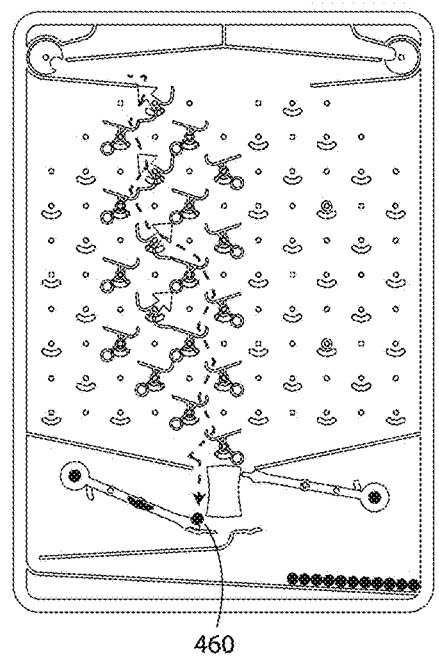

As depicted in FIG. 9D, execution of the program continues in this manner until the 4-bit counter indicates a value of "12," at which point the twelfth unit 460 has been released by the incremental unit dispenser 104 and traversed down the programmable flow path. The 4-bit counter program terminates with the bits 452 and 453 both position to the right, thereby indicating "4" and "8," respectively.

Referring to FIGS. 10A-J, an example exclusive-OR gate (XOR) and its execution are depicted in accordance with an embodiment of the disclosure. The XOR gate takes two inputs (i.e., the positions of gear bits 500 and 501) and generates an output (the color of the unit 106 that is captured by interceptor 502). In this configuration, when a black colored unit 106 drops into the interceptor 502, it represents an output of "true," and when a white colored unit 106 drops into the interceptor 502, it represents an output of "false"; other outputs are also contemplated. The four possible starting conditions are depicted in FIGS. 10A, 10D, 10F and 10H respectively.

Figure 10A:
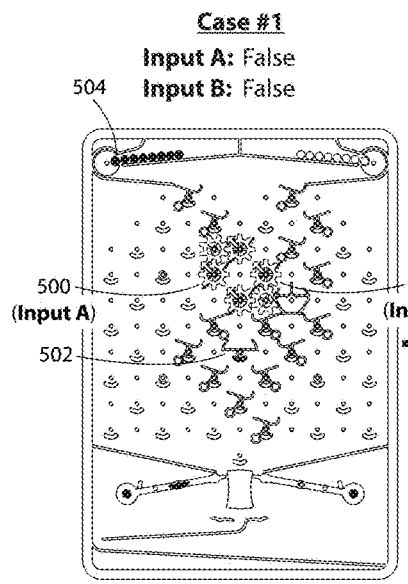
FIGS. 10A-J depict a mechanical computing system configured as an XOR gate, as well as its execution, in accordance with an embodiment of the disclosure.

Case #1, wherein inputs A and B are both "false," is depicted in FIG. 10A. In an XOR gate, when both inputs are false, the output should be false. The program begins at FIG. 9A, in which gear bit 500 (input A) starts pointed to the left (a logical false) and gear bit 501 (input B) also starts pointed to the left (a logical false).

Figure 10B:
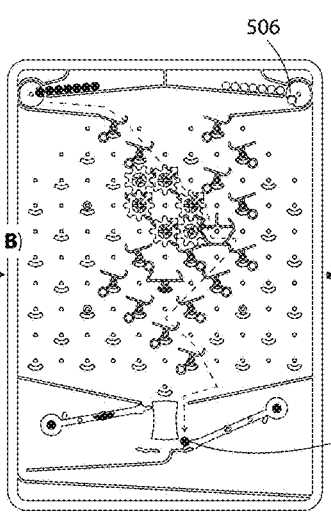
Figure 10C:
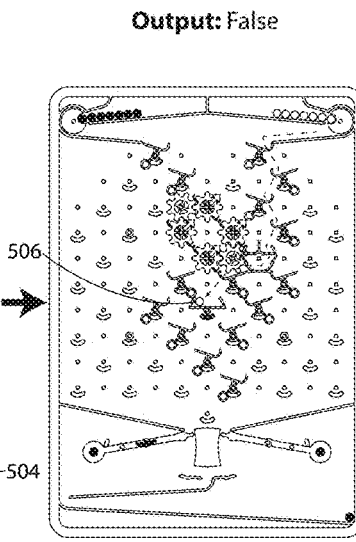

As depicted in FIG. 10B, when the left side incrementor 122 is depressed to start the program, a black colored unit 504 is released. The unit traverses through the flow path until it depresses the right side interceptor 122, thereby releasing a white colored unit 506. As depicted in FIG. 10C, the white colored unit 506 then traverses through the flow path to reach the interceptor 502.

Figure 10D:
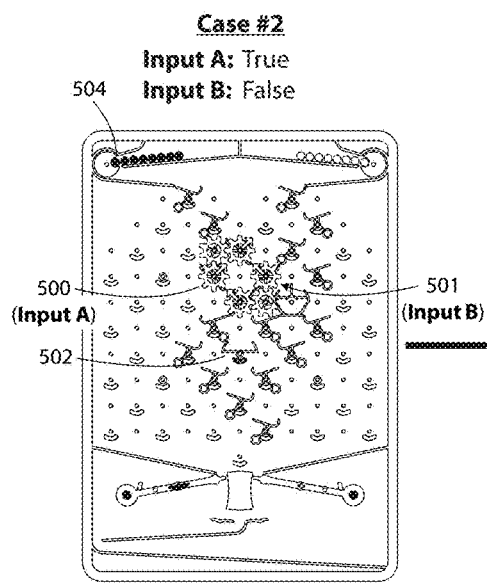
Figure 10E:
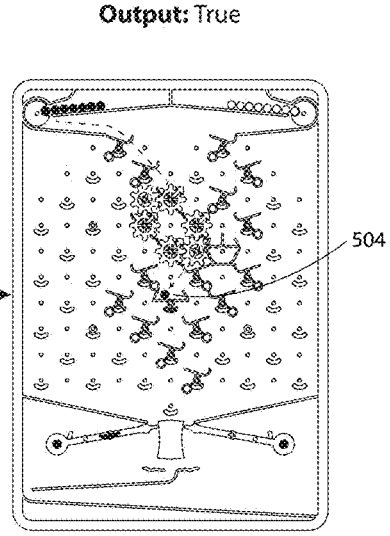

Case #2, wherein input A is "true" and input B is "false," is depicted in FIG. 10D. In an XOR gate, when one input is true and the other is false, the output should be true. The program begins at FIG. 10D, in which gear bit 500 (input A) starts pointed to the right (a logical true) and gear bit 501 (input B) starts pointed to the left (a logical false). As depicted in FIG. 10E, when the left side incrementor 122 is depressed to start the program, a black colored unit 504 is released. The unit 504 traverses through the flow path to reach the interceptor 502.

Figures 10F, 10G:
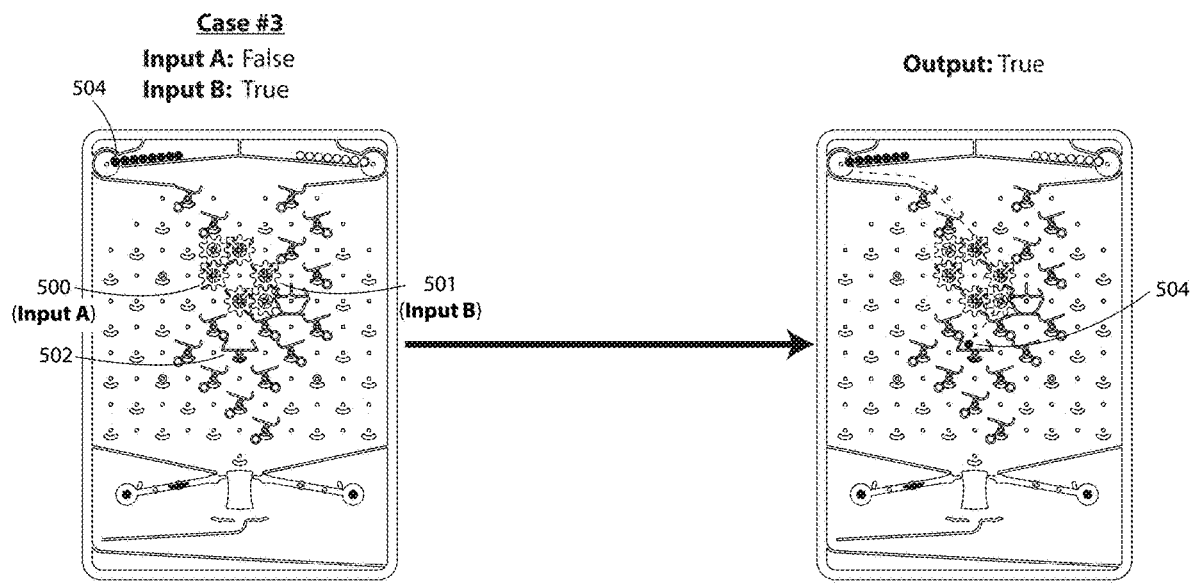

Case #3, wherein input A is "false" and input B is "true," is depicted in FIG. 10F. In an XOR gate, when one input is true and the other is false, the output should be true. The program begins at FIG. 10F, in which gear bit 500 (input A) starts pointed to the left (a logical false) and gear bit 501 (input B) starts pointed to the right (a logical true). As depicted in FIG. 10G, when the left side incrementor 122 is depressed to start the program, a black colored unit 504 is released. The unit 504 traverses through the flow path to reach the interceptor 502.

Figures 10H, 10I, 10J:
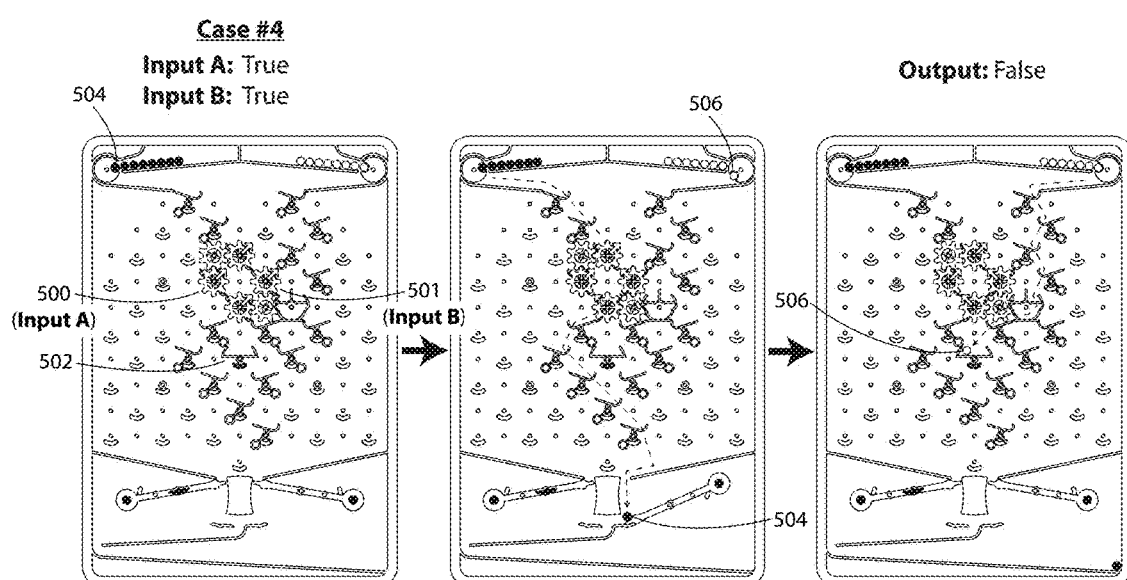

Case #4, wherein inputs A and B are both "true," is depicted in FIG. 10H. In an XOR gate, when both inputs are true, the output should be false. The program begins at FIG. 10H, in which gear bit 500 (input A) starts pointed to the right (a logical true) and gear bit 501 (input B) also starts pointed to the right (a logical true).

As depicted in FIG. 10I, when the left side incrementor 122 is depressed to start the program, a black colored unit 504 is released. The unit traverses through the flow path until it depresses the right side interceptor 122, thereby releasing a white colored unit 506. As depicted in FIG. 10J, the white colored unit 506 then traverses through the flow path to reach the interceptor 502.

Referring to FIGS. 11A-D, an example of a programmable path configured to add two binary numbers is depicted in accordance with an embodiment of the disclosure. When the program is complete, the mechanical computing system 100 displays the sum.

Figures 11A, 11B, 11C, 11D:
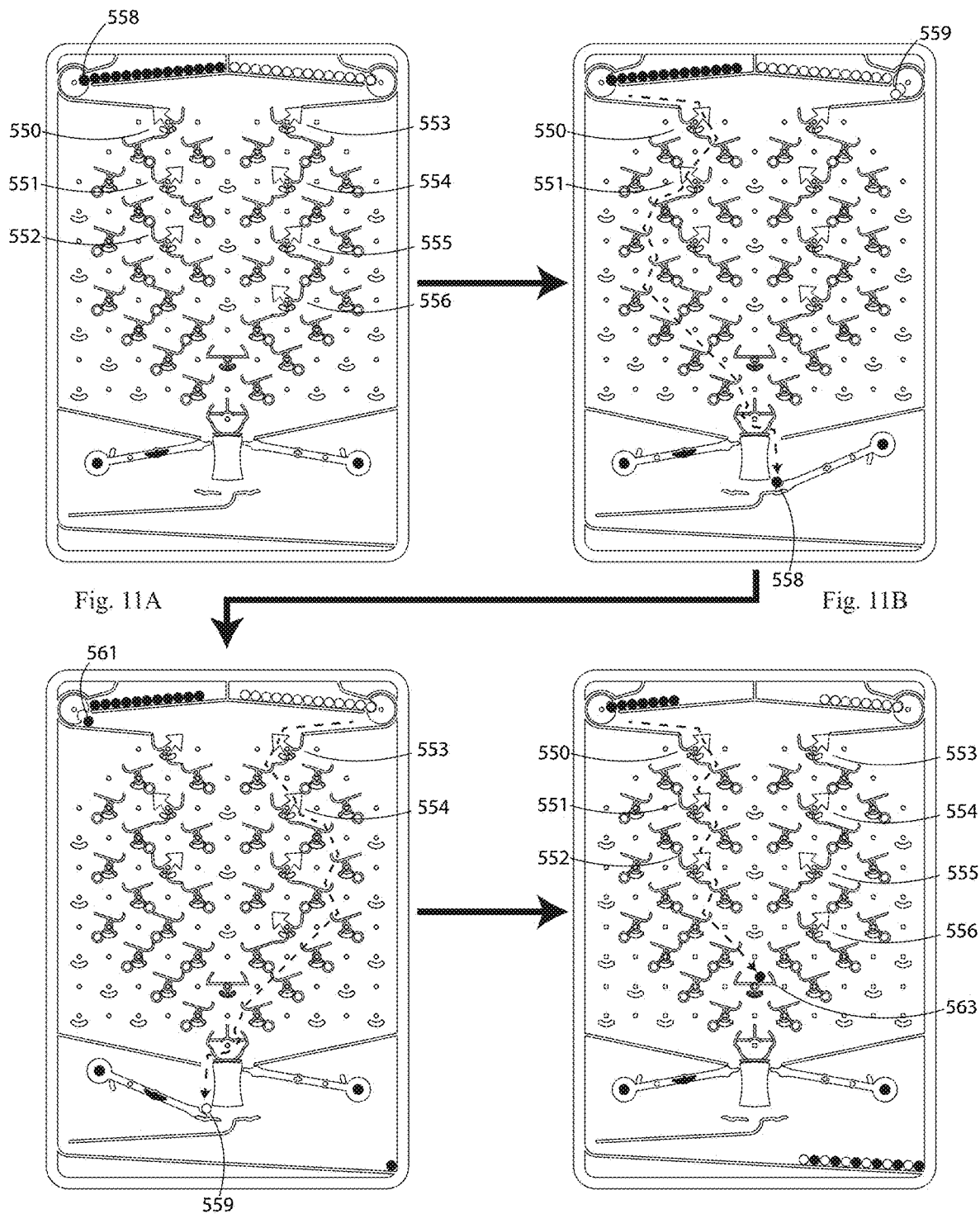
FIGS. 11A-D depict a mechanical computing system configured to add two binary numbers, in accordance with an embodiment of the disclosure.

As depicted in FIG. 11A, bits 550, 551, and 552 are configured to display a 3-bit binary number wherein bit 550 represents the lowest value digit and bit 552 represents the highest value digit. Bits 553, 554, 555, and 556 are configured to display a 4-bit binary number, wherein bit 553 represents the lowest value digit and bit 556 represents the highest value digit. In this example, the mechanical computing system 100 begins with the 3-bit binary number set to a value of "6," and the 4-bit binary number set to a value of "5." When the program is run, the 3-bit binary number and the 4-bit binary number are added together and the sum is displayed in the place of the 4-bit binary number.

As depicted in FIG. 11B, when the left side incrementor 122 is depressed to start the program, a unit 558 is released. The unit travels over bit 550, flipping it to the right. The unit 558 then rolls down and flips bit 551 to the left. The unit 558 is then carried along by a series of ramps 128 until it depresses the right side incrementor 122, thereby releasing a second unit 559. At this point, the 3-bit binary number displays a value of five, one less than its starting value.

As depicted in FIG. 11C, as unit 559 traverses through the flow path, it flips bit 553 to the left, and bit 554 to the right. The unit 559 is then carried along by a series of ramps 128 until it depresses the left side incrementor 122, thereby releasing a third unit 561. At this point, the 4-bit binary number displays a value of six, one more than its starting value. In this way, the mechanical computing system 100 decrements the 3-bit binary number and increments the 4-bit binary number, until the 3-bit binary number equals zero.

As depicted in FIG. 11D, when the next unit is released, it will flip bits 550, 551, and 552 to the right, thereby directing the unit to the interceptor 563, causing execution to halt. At that point, the 4-bit binary number displays "11," the sum of the initial 3-bit and 4-bit binary numbers.

Figure 12:
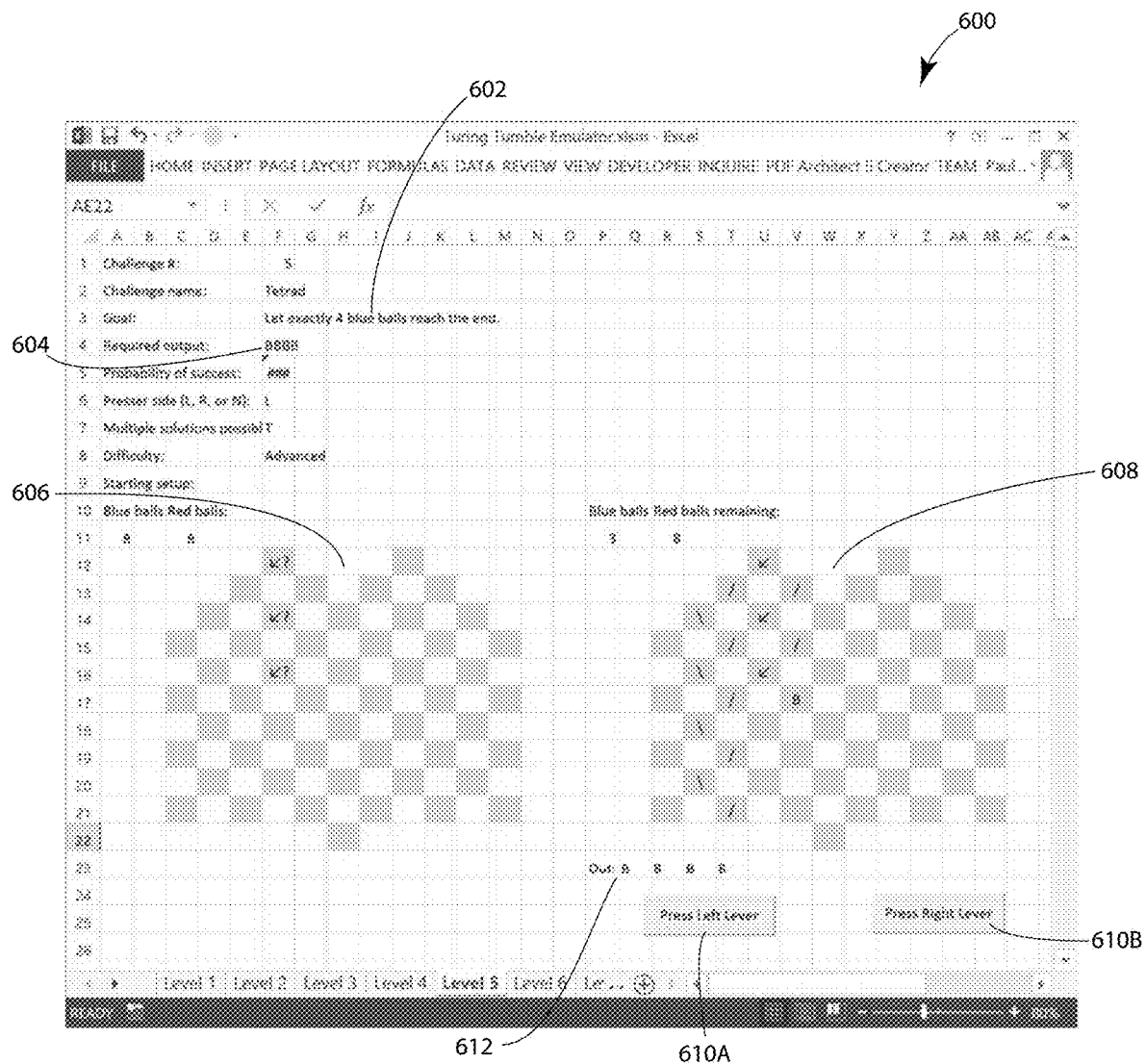
FIG. 12 depicts an electronic version of the mechanical computing system, in accordance with an embodiment of the disclosure.

Through various combinations of the repositionable members 108 a virtually unlimited number of flow paths can be programmed into the mechanical computing system. In some embodiments, the mechanical computing system 100 can be constructed of physical components, offering a user a hands-on experience in the construction of various programmable paths and enabling the user to observe the physical interactions between the components as the system 100 carries out the instructions of the program. In other embodiments, the computing system can be modeled electronically. Referring to FIG. 12, an example embodiment of an electronic version of the mechanical computing system 600 is depicted in accordance with an embodiment of the disclosure. In this embodiment, the physical version of the mechanical computing system is visually depicted on a display, such as a computer screen or mobile computing device.

In one embodiment, the mechanical computing system 600 can be configured to display one or more levels, each of which has an associated goal or objective 602. A required output 604 for successful completion can be shown to reiterate the objective 602. In one embodiment, the system 600 can include an initial configuration 606, which may include a model of one or more repositionable members pre-positioned on a substrate. A user can then add additional repositionable members to complete the programmable path 608 capable of performing the desired objective 602. In one embodiment, the programmable path 608 can be tested by activating virtual buttons 610A/B to initiate an incremental unit dispenser, thereby incrementally dispensing virtual units. The system 600 then simulates units traversing through the programmable path 608. As the system progresses, the simulated output 612 displays the order of units that have completed their traversal through the programmable path 608.

Various embodiments of systems, devices, and methods have been described herein. These embodiments are given only by way of example and are not intended to limit the scope of the claimed inventions. It should be appreciated, moreover, that the various features of the embodiments that have been described may be combined in various ways to produce numerous additional embodiments. Moreover, while various materials, dimensions, shapes, configurations and locations, etc. have been described for use with disclosed embodiments, others besides those disclosed may be utilized without exceeding the scope of the claimed inventions.

It should be understood that the individual steps used in the methods of the present teachings may be performed in any order and/or simultaneously, as long as the teaching remains operable. Furthermore, it should be understood that the apparatus and methods of the present teachings can include any number, or all, of the described embodiments, as long as the teaching remains operable.

Persons of ordinary skill in the relevant arts will recognize that the subject matter hereof may comprise fewer features than illustrated in any individual embodiment described above. The embodiments described herein are not meant to be an exhaustive presentation of the ways in which the various features of the subject matter hereof may be combined. Accordingly, the embodiments are not mutually exclusive combinations of features; rather, the various embodiments can comprise a combination of different individual features selected from different individual embodiments, as understood by persons of ordinary skill in the art. Moreover, elements described with respect to one embodiment can be implemented in other embodiments even when not described in such embodiments unless otherwise noted.

Although a dependent claim may refer in the claims to a specific combination with one or more other claims, other embodiments can also include a combination of the dependent claim with the subject matter of each other dependent claim or a combination of one or more features with other dependent or independent claims. Such combinations are proposed herein unless it is stated that a specific combination is not intended.

Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

For purposes of interpreting the claims, it is expressly intended that the provisions of 35 U.S.C. § 112(f) are not to be invoked unless the specific terms "means for" or "step for" are recited in a claim.

What is claimed is:

1. A mechanical computing system comprising:
a substrate having an upstream portion and a downstream portion;
an incremental unit dispenser configured to incrementally dispense a plurality of units along a flow path of the substrate from the upstream portion to the downstream portion;
a plurality of repositionable members operably coupled to the substrate and configured to guide and interact with the plurality of units along the flow path, wherein a first repositionable member is configured to pivot relative to the substrate upon interaction with at least one unit of the a plurality of units, and a second repositionable member positioned upstream of the first repositionable member is configured to pivot relative to the substrate based on the pivoting of the first repositionable member.

2. The mechanical computing system of claim 1, wherein the first repositionable member is a gear bit configured to display and store bits of information.

3. The mechanical computing system of claim 2, wherein the gear bit is further configured to interact with one or more adjacent repositionable members upon pivoting.

4. The mechanical computing system of claim 1, wherein at least one of the plurality of repositionable members includes a ramp configured to serve as a conduit to move at least one unit along the flow path.

5. The mechanical computing system of claim 1, wherein at least one of the plurality of repositionable members includes a crossover configured to maintain a lateral course of at least one unit along the flow path.

6. The mechanical computing system of claim 1, wherein at least one of the plurality of repositionable members includes a bit configured to display and store bits of information.

7. The mechanical computing system of claim 1, wherein at least one of the plurality of repositionable members includes a gear configured to interact with one or more adjacent repositionable members upon pivoting.

8. The mechanical computing system of claim 1, wherein at least one of the plurality of repositionable members includes an interceptor configured to capture at least one unit, thereby ending the incremental dispensation of subsequent units.

9. The mechanical computing system of claim 1, further comprising a second incremental unit dispenser configured to incrementally dispense a plurality of units along the flow path.

10. A game configured to serve as an aid in learning fundamental aspects of coding, the game comprising:
a board having a flow path between an upstream portion and a downstream portion; and a plurality of repositionable programming members pivotable coupled to the board and configured to guide and interact with marbles dispensed along the flow path from the upstream portion to the downstream portion, wherein a first programming member is configured to pivot relative to the board upon interaction with a marble traversing along the flow path, and wherein a second programming member positioned upstream of the first programming member is configured to pivot relative to the board based on feedback from the first programming member.

11. The mechanical computing system of claim 10, wherein the first repositionable member is a gear bit configured to display and store bits of information.

12. The mechanical computing system of claim 11, wherein the gear bit is further configured to interact with one or more adjacent repositionable members upon pivoting.

13. The mechanical computing system of claim 10, wherein at least one of the plurality of repositionable members includes a ramp configured to serve as a conduit to move at least one marble along the flow path.

14. The mechanical computing system of claim 10, wherein at least one of the plurality of repositionable members includes a crossover configured to maintain a lateral course of at least one marble along the flow path.

15. The mechanical computing system of claim 10, wherein at least one of the plurality of repositionable members includes a bit configured to display and store bits of information.

16. The mechanical computing system of claim 10, wherein at least one of the plurality of repositionable members includes a gear configured to interact with one or more adjacent repositionable members upon pivoting.

17. The mechanical computing system of claim 10, wherein at least one of the plurality of repositionable members includes an interceptor configured to capture at least one marble, thereby ending the incremental dispensation of subsequent marbles.

18. The mechanical computing system of claim 10, further comprising a first incremental unit dispenser and second incremental unit dispenser configured to incrementally dispense a plurality of marbles along the flow path.

19. The mechanical computing system of claim 10, wherein positioning the plurality of repositionable programming members on the board enables the game to carry out one or more logic functions.

20. A method of operating a mechanical computing system comprising:
providing a substrate having an upstream portion and a downstream portion;
positioning at least a first repositionable member and a second repositionable member on the substrate, wherein the second repositionable member is positioned upstream of the first repositionable member; and
incrementally dispensing a plurality of units along a flow path of the substrate from the upstream portion to the downstream portion, wherein the first repositionable member is configured to pivot relative to the substrate upon interaction with at least one unit of the a plurality of units, and the second repositionable member is configured to pivot relative to the substrate based on the pivoting of the first repositionable member.

* * * * *